(12) United States Patent
Kim

(10) Patent No.: US 8,740,712 B2
(45) Date of Patent: Jun. 3, 2014

(54) STEERING SHAFT WITH MISASSEMBLY PREVENTION STRUCTURE

(71) Applicant: Mando Corporation, Gyeonggi-do (KR)

(72) Inventor: Dong Keun Kim, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 0 days.

(21) Appl. No.: 13/659,476

(22) Filed: Oct. 24, 2012

(65) Prior Publication Data

US 2013/0102399 A1    Apr. 25, 2013

(30) Foreign Application Priority Data

Oct. 24, 2011  (KR) .................. 10-2011-0108568

(51) Int. Cl.
*F16D 1/112*    (2006.01)

(52) U.S. Cl.
USPC ............. 464/23; 403/13; 403/359.1; 464/182

(58) Field of Classification Search
CPC ............. B62D 1/20; F16D 3/387; F16D 3/40; F16D 2001/103
USPC ............ 464/23, 30, 134, 182; 403/11, 13, 14, 403/316, 319, 359.1; 74/492; 16/2.1
See application file for complete search history.

(56) References Cited

U.S. PATENT DOCUMENTS

| | | | |
|---|---|---|---|
| 2,704,681 A * | 3/1955 | Fischer | |
| 4,464,137 A * | 8/1984 | Jennings | |
| 4,537,523 A * | 8/1985 | Haldric | |
| 8,277,142 B2 * | 10/2012 | Hoshino et al. | |
| 2011/0129294 A1 | 6/2011 | Hoshino et al. | |

FOREIGN PATENT DOCUMENTS

| | | |
|---|---|---|
| DE | 8 901 865 U1 | 4/1989 |
| WO | 2010/116537 A1 | 10/2010 |
| WO | WO 2010/116537 A1 * | 10/2010 |

OTHER PUBLICATIONS

Split Steel Bushings, Bearing Service, Inc., Mar. 27, 2010, pp. 1-5 [online] [retrieved on Jul. 16, 2013] Retrieved from the Internet: web.archive.org/web/2010032704034/http://www.bearingservice.com/products/.*

* cited by examiner

*Primary Examiner* — Gregory Binda
(74) *Attorney, Agent, or Firm* — McDermott Will & Emery LLP

(57) ABSTRACT

A steering shaft which is provided with a misassembly prevention structure for preventing misassembly when a shaft is inserted into and assembled with a yoke.

6 Claims, 9 Drawing Sheets (a)

(b)

(a)

(b)

(a)

(b)

(a)

(b)

(a)

(b)

(a)

(b)

(a)

(b)

(a)

(b)

(a)

(b)

STEERING SHAFT WITH MISASSEMBLY PREVENTION STRUCTURE

CROSS-REFERENCE TO RELATED APPLICATION

This application claims priority from and the benefit under 35 U.S.C. §119(a) of Korean Patent Application No. 10-2011-0108568, filed on Oct. 24, 2011, which is hereby incorporated by reference for all purposes as if fully set forth herein.

BACKGROUND OF THE INVENTION

1. Field of the Invention

The present invention relates to a steering shaft, and more particularly, to a steering shaft which is provided with a misassembly prevention structure for preventing misassembly when a shaft is inserted into and assembled with a yoke.

2. Description of the Prior Art

A steering shaft is a power transmission member, and includes a yoke and a shaft. If the steering shaft is mounted in a vehicle in the state in which the steering shaft is correctly assembled when it is assembled by coupling the yoke and the shaft to each other, serious problems may be caused in terms of steering and safety.

What is more serious is that even if the steering shaft is misassembled, this may not be confirmed instantly, and the yoke and the shaft may come off after a certain period of time from the misassembly or when or after an impact occurs. If such a situation occurs while driving, a very serious accident may be caused.

SUMMARY OF THE INVENTION

Accordingly, the present invention has been made to solve the above-mentioned problems occurring in the prior art, and an object of the present invention is to provide a steering shaft with a misassembly prevention structure for preventing misassembly when a shaft is inserted into and assembled with a yoke.

In order to accomplish this object, there is provided a steering shaft with a misassembly prevention structure including: a shaft; a slip member; and a yoke. The shaft includes: a torsion bar formed in the axial direction from an end of the shaft; serrations are formed on the outer peripheral surface of the shaft from the area where the formation of the torsion bar is terminated; and a groove formed as a recess from the area where the formation of the serrations is terminated, the slip member is configured to be coupled with the shaft by inserting the torsion bar into the slip member, and the yoke includes: serrations formed on the inner peripheral surface of the yoke to be tooth-meshed with the serrations formed on the shaft when the shaft coupled with the slip member is inserted into the yoke; and a bolt tightening hole to bolt the yoke with the shaft.

In the steering shaft, the slip member may be a bush type, in which the opposite sides in the axial direction are opened, or a cap type, in which only one side in the axial direction is opened.

The steering shaft may further include a groove formed along the inner peripheral surface of the slip member, and a ring inserted into the groove.

In the steering shaft, the slip member may have a slit formed in the axial direction.

The steering shaft may further include a groove formed along the outer peripheral surface of the torsion bar, and a ring inserted into the groove.

In the steering shaft, when a groove is formed along the outer peripheral surface of the torsion bar, and the steering shaft further includes a ring inserted into the groove, a groove may be formed along the inner peripheral surface of the slip member, and the ring may be inserted into a space formed as the groove formed along the inner peripheral surface of the slip member and the groove formed along the outer peripheral surface of the torsion bar are opposed to each other.

In the steering shaft, when a groove is formed along the outer peripheral surface of the torsion bar, and the steering shaft further includes a ring inserted into the groove, the inner peripheral surface may be diametrically expanded at an area corresponding to the area where the groove formed along the outer peripheral surface of the torsion bar is formed.

In the steering shaft, a groove may be formed along the outer peripheral surface of the torsion bar, and the slip member may be formed with a protrusion corresponding to the groove along the inner peripheral surface thereof.

In the steering shaft, the slip member may be formed from a plastic material or a metal material.

As described above, in accordance with the present invention, there is provided a steering shaft with a misassembly prevention structure for preventing misassembly when a shaft is inserted into and assembled with a yoke.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
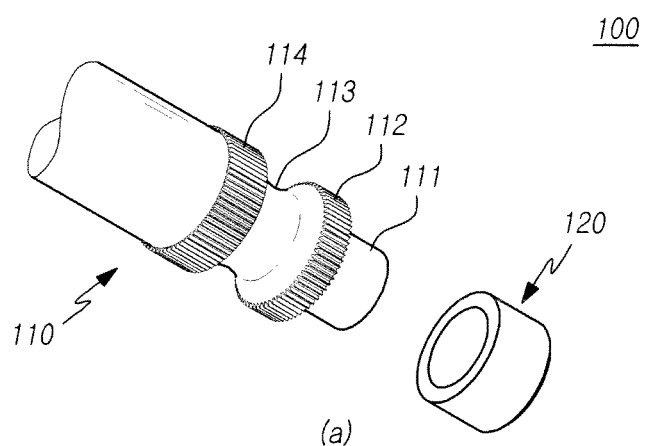
FIG. 1 illustrates a steering shaft with a misassembly prevention structure in accordance with an exemplary embodiment of the present invention.
Figure 1:
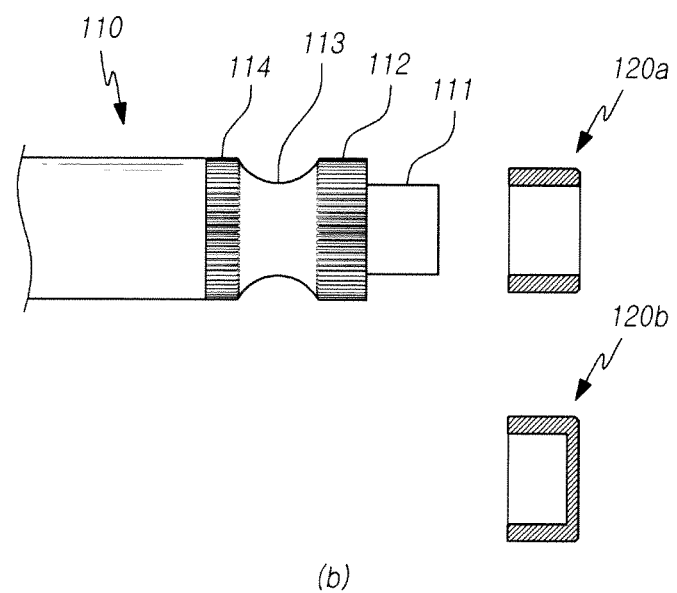

A steering shaft with a misassembly prevention structure disclosed herein is manufactured by assembling a shaft, a yoke, etc., and is configured in such a manner that when the shaft and the yoke are misassembled, the shaft and the yoke are not rotated in unison, but rather one of the shaft and the yoke idles, whereby the misassembled state can be quickly inspected to prevent misassembly.

For this purpose, the steering shaft with a misassembly prevention structure includes: a shaft including a torsion bar formed in the axial direction from an end of the shaft, serrations formed on the outer peripheral surface of the shaft from the area where the formation of the torsion bar is terminated, and a groove formed as a recess from the area where the formation of the serrations is terminated; a slip member configured to be coupled with the shaft by inserting the torsion bar into the slip member; and a yoke including serrations formed on the inner peripheral surface of the yoke to be tooth-meshed with the serrations formed on the shaft when the shaft coupled with the slip member is inserted into the yoke, and a bolt tightening hole formed to bolt the yoke with the shaft.

The slip member may be a bush type, in which the opposite sides in the axial direction are opened, or a cap type, in which only one side in the axial direction is opened.

In order to reduce a press-fit load, the slip member may be slit in the axial direction.

In a case where a groove is formed along the inner peripheral surface of the slip member, the steering shaft may further include a ring adapted to be inserted into the groove formed along the inner peripheral surface of the slip member.

In addition, in a case where a groove is formed along the outer peripheral surface of the torsion bar of the shaft, the steering shaft may further include a ring adapted to be inserted into the groove formed along the outer peripheral surface of the torsion bar.

In addition, a groove may be formed along the outer peripheral surface of the torsion bar of the shaft, and a ring may be inserted into the groove formed along the outer peripheral surface of the torsion bar, in which case a groove may be further formed along inner peripheral surface of the slip member, and a ring may be inserted into a space which is formed as the groove formed along inner peripheral surface of the slip member and the groove formed along the outer peripheral surface of the torsion bar are opposed to each other.

Furthermore, a groove may be formed along the outer peripheral surface of the torsion bar of the shaft, and a ring may be inserted into the groove formed along the outer peripheral surface of the torsion bar, in which case the inner peripheral surface of the slip member may be diametrically expanded. Herein, the diametrically expanded area may correspond to the groove-formed area where the groove is formed along the outer peripheral surface of the torsion bar.

Moreover, a groove may be formed along the outer peripheral surface of the torsion bar of the shaft, and the slip member may be formed with a protrusion on the inner peripheral surface thereof to correspond to the groove formed along the outer peripheral surface of the torsion bar of the shaft.

The slip member may be formed, for example, from a plastic material or a metal material.

Hereinafter, exemplary embodiments of the present invention will be described with reference to the illustrative drawings.

In denoting reference numerals to the elements in the individual drawings, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Hereinbelow, various exemplary embodiments in relation to a coupling structure between the shaft and the slip member will be described with reference to FIGS. 1 to 8, and a misassembly prevention principle will be described in more detail with reference FIG. 9 which illustrates a correct assembled state and a misassembled state between the shaft coupled with a slip member and a yoke under such a coupling structure between the shaft and the slip member.

FIG. 1 illustrates a steering shaft 100 with a misassembly prevention structure according to an exemplary embodiment of the present invention. In FIG. 1, FIG. 1a is a perspective view of the steering shaft 100, and FIG. 1b is a partial cross-sectional view of the steering shaft 100.

Referring to FIG. 1, in the steering shaft 100 with a misassembly prevention structure according to an exemplary embodiment of the present invention, an end portion of the shaft 110 is inserted into a slip member 120, whereby the shaft 110 and the slip member 120 are coupled to each other.

On the shaft 110, a torsion bar 111 is formed in the axial direction from the end of the shaft 110, serrations 112 are formed around the outer peripheral surface of the shaft 110 from the area where the formation of the torsion bar 111 is terminated, and a groove 113 is formed as a recess from the area where the formation of the serrations 112 is terminated. In order to further strengthen the tooth-meshing force between the shaft 110 and the yoke, serrations 114 may be further formed following the groove 113.

As illustrated in FIG. 1b, in the steering shaft 100 with a misassembly prevention structure according to an exemplary embodiment of the present invention, the slip member 120, into which the torsion bar 111 of the shaft 110 is inserted, may be a bush type 120a, in which the opposite sides in the axial direction are opened, or a cap type 120b, in which only one side in the axial direction is opened.

Figure 2:
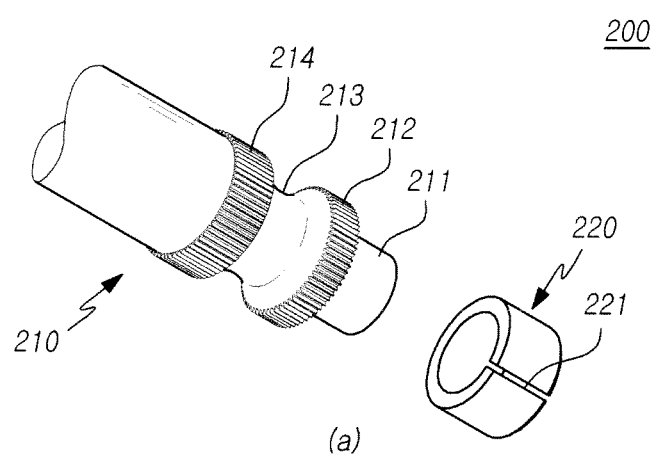
FIG. 2 illustrates a steering shaft with a misassembly prevention structure in accordance with another exemplary embodiment of the present invention.
Figure 2:
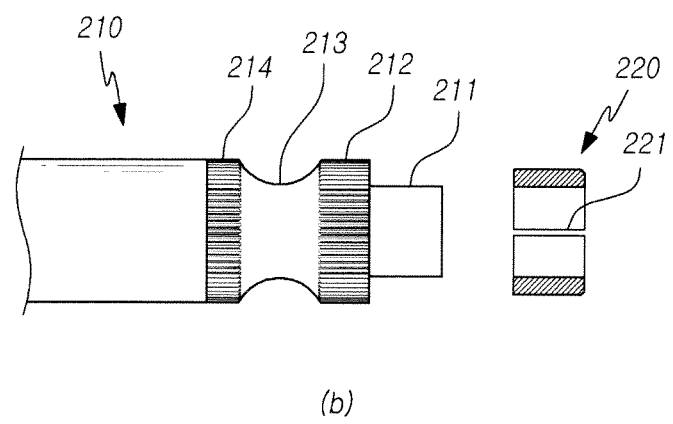

FIG. 2 illustrates a steering shaft 200 with a misassembly prevention structure in accordance with another exemplary embodiment of the present invention. In FIG. 2, FIG. 2a is a perspective view of the steering shaft 200, and FIG. 2b is a partial cross-sectional view of the steering shaft 200.

Referring to FIG. 2, in the steering shaft 200 with a misassembly prevention structure according to an exemplary embodiment of the present invention, an end portion of the shaft 210 is inserted into a slip member 220, whereby the shaft 210 and the slip member 220 are coupled to each other.

On the shaft 210, a torsion bar 211 is formed in the axial direction from the end of the shaft 210, serrations 212 are formed around the outer peripheral surface of the shaft 210 from the area where the formation of the torsion bar 211 is terminated, and a groove 213 is formed as a recess from the area where the formation of the serrations 212 is terminated. In order to further strengthen the tooth-meshing force between the shaft 210 and the yoke, serrations 214 may be further formed following the groove 213.

As illustrated in FIG. 2, in the steering shaft 200 with a misassembly prevention structure according to the present exemplary embodiment, the slip member 220 may be formed with a slit 221 in the axial direction in order to reduce a press-fit load.

Figure 3:
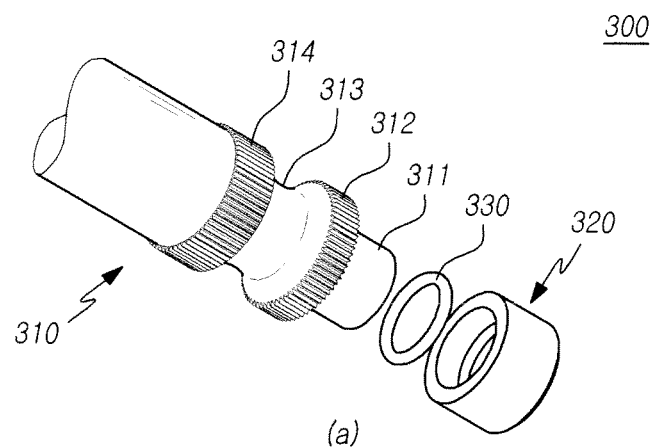
FIG. 3 illustrates a steering shaft with a misassembly prevention structure in accordance with another exemplary embodiment of the present invention.
Figure 3:
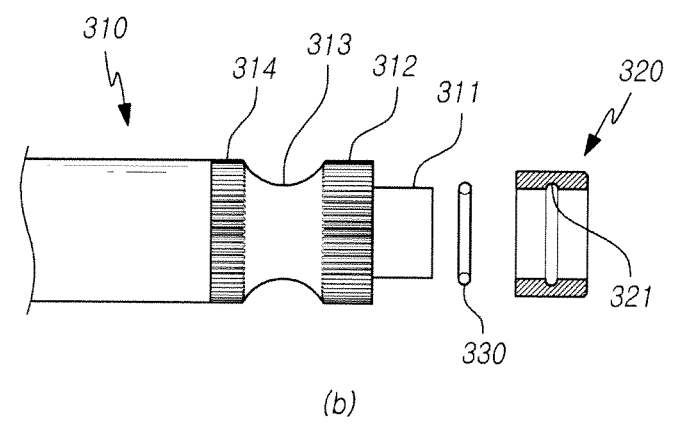

FIG. 3 illustrates a steering shaft 300 with a misassembly prevention structure in accordance with another exemplary embodiment of the present invention. In FIG. 3, FIG. 3a is a perspective view of the steering shaft 300, and FIG. 3b is a partial cross-sectional view of the steering shaft 300.

Referring to FIG. 3, in the steering shaft 300 with a misassembly prevention structure according to another exemplary embodiment of the present invention, an end portion of the shaft 310 is inserted into a slip member 320, whereby the shaft 310 and the slip member 320 are coupled to each other.

On the shaft 310, a torsion bar 311 is formed in the axial direction from the end of the shaft 310, serrations 312 are formed around the outer peripheral surface of the shaft 310 from the area where the formation of the torsion bar 311 is terminated, and a groove 313 is formed as a recess from the area where the formation of the serrations 312 is terminated. In order to further strengthen the tooth-meshing force between the shaft 310 and the yoke, serrations 314 may be further formed following the groove 313.

In the state in which the shaft 310 and the slip member 320 are coupled to each other, vibration or noise may be produced between the slip member 320 and the torsion bar 311.

In order to reduce such vibration or noise, the steering shaft 300 may further include a groove 321 formed along the inner peripheral surface of the slip member 320, and a ring 330 inserted into the groove 321 formed along the inner peripheral surface of the slip member 320.

Although the ring 330 is illustrated as a circular ring in FIG. 3, the ring may be an angled ring or a ring with any other shape.

The material of the ring 330 may be, for example, a plastic material or a rubber material, and any other material may be used for forming the ring 330 if the material is vibration-absorptive.

As illustrated in FIG. 3, in the steering shaft 300 with a misassembly prevention structure according to the present exemplary embodiment, it is possible to reduce vibration and noise produced in the steering shaft 300 by additionally inserting the ring 330 between the slip member 320 and the torsion bar 311.

Figure 4:
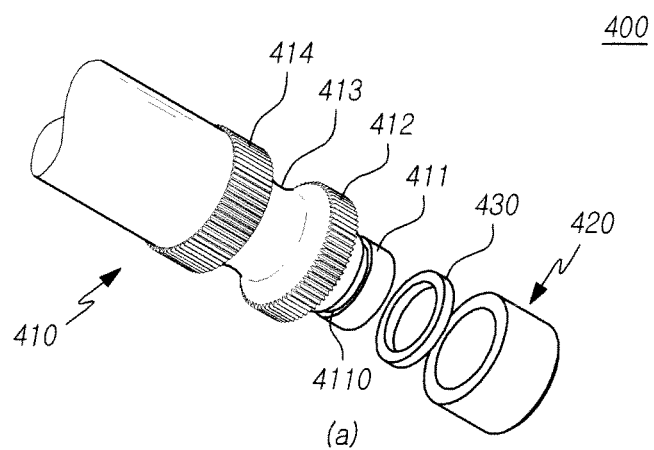
FIG. 4 illustrates a steering shaft with a misassembly prevention structure in accordance with still another exemplary embodiment of the present invention.
Figure 4:
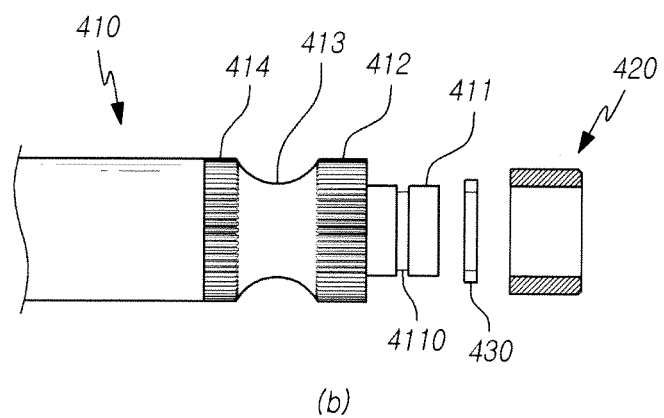

FIG. 4 illustrates a steering shaft 400 with a misassembly prevention structure in accordance with still another exemplary embodiment of the present invention. In FIG. 4, FIG. 4a is a perspective view of the steering shaft 400, and FIG. 4b is a partial cross-sectional view of the steering shaft 400.

Referring to FIG. 4, in the steering shaft 400 with a misassembly prevention structure according to still another exemplary embodiment of the present invention, an end portion of the shaft 410 is inserted into a slip member 420, whereby the shaft 410 and the slip member 420 are coupled to each other.

On the shaft 410, a torsion bar 411 is formed in the axial direction from the end of the shaft 410, serrations 412 are formed around the outer peripheral surface of the shaft 410 from the area where the formation of the torsion bar 411 is terminated, and a groove 413 is formed as a recess from the area where the formation of the serrations 412 is terminated. In order to further strengthen the tooth-meshing force between the shaft 410 and the yoke, serrations 414 may be further formed following the groove 413.

In the state in which the shaft 410 and the slip member 420 are coupled to each other, vibration or noise may be produced between the slip member 420 and the torsion bar 411.

In order to reduce such vibration or noise, the steering shaft 400 may further include a groove 4110 formed along the outer peripheral surface of the torsion bar 411, and a ring 430 inserted into the groove 4110 formed along the outer peripheral surface of the torsion bar 411.

Although the ring 430 is illustrated as a circular ring in FIG. 4, the ring may be an angled ring or a ring with any other shape.

The material of the ring 430 may be, for example, a plastic material or a rubber material, and any other material may be used for forming the ring 430 if the material is vibration-absorptive.

As illustrated in FIG. 4, in the steering shaft 400 with a misassembly prevention structure according to the present exemplary embodiment, it is possible to reduce vibration and noise produced in the steering shaft 400 by additionally inserting the ring 430 between the slip member 420 and the torsion bar 411.

Figure 5:
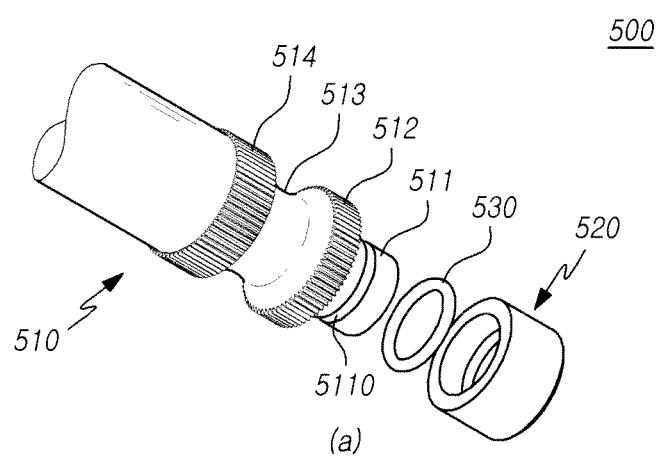
FIG. 5 illustrates a steering shaft with a misassembly prevention structure in accordance with still another exemplary embodiment of the present invention.
Figure 5:
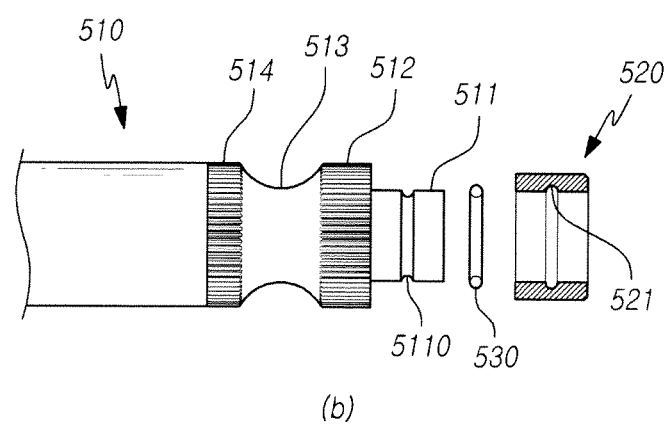

FIG. 5 illustrates a steering shaft 500 with a misassembly prevention structure in accordance with still another exemplary embodiment of the present invention. In FIG. 5, FIG. 5a is a perspective view of the steering shaft 500, and FIG. 5b is a partial cross-sectional view of the steering shaft 500.

Referring to FIG. 5, in the steering shaft 500 with a misassembly prevention structure according to still another exemplary embodiment of the present invention, an end portion of the shaft 510 is inserted into a slip member 520, whereby the shaft 510 and the slip member 520 are coupled to each other.

On the shaft 510, a torsion bar 511 is formed in the axial direction from the end of the shaft 510, serrations 512 are formed around the outer peripheral surface of the shaft 510 from the area where the formation of the torsion bar 511 is terminated, and a groove 513 is formed as a recess from the area where the formation of the serrations 512 is terminated. In order to further strengthen the tooth-meshing force between the shaft 510 and the yoke, serrations 514 may be further formed following the groove 513.

In the state in which the shaft 510 and the slip member 520 are coupled to each other, vibration or noise may be produced between the slip member 520 and the torsion bar 511.

In order to reduce such vibration or noise, the steering shaft 500 may further include a groove 5110 formed along the outer peripheral surface of the torsion bar 511, and a groove 521 formed along the inner peripheral surface of the slip member 520, and a ring 530 inserted into a space which is formed as the groove 521 formed along the inner peripheral surface of the slip member 520 and the groove 5110 formed along the outer peripheral surface of the torsion bar 511 are opposed to each other.

Although the ring 530 is illustrated as a circular ring in FIG. 5, the ring may be an angled ring or a ring with any other shape.

The material of the ring 530 may be, for example, a plastic material or a rubber material, and any other material may be used for forming the ring 530 if the material is vibration-absorptive.

As illustrated in FIG. 5, in the steering shaft 500 with a misassembly prevention structure according to the present exemplary embodiment, it is possible to reduce vibration and noise produced in the steering shaft 500 by additionally inserting the ring 530 between the slip member 520 and the torsion bar 511.

Figure 6:
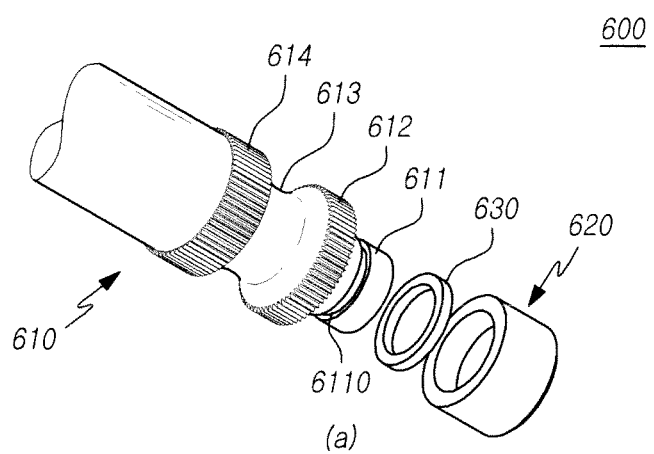
FIG. 6 illustrates a steering shaft with a misassembly prevention structure in accordance with still another exemplary embodiment of the present invention.
Figure 6:
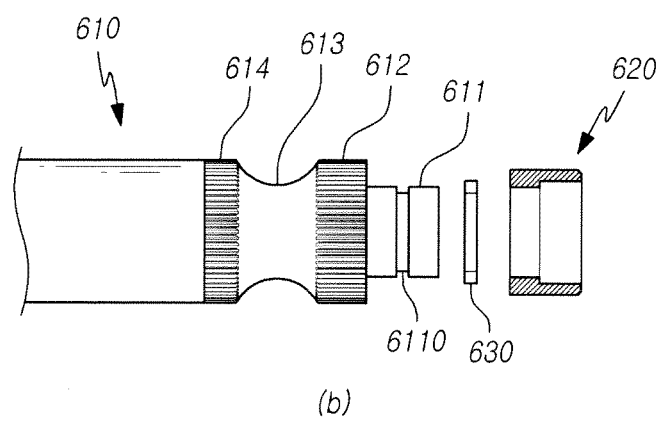

FIG. 6 illustrates a steering shaft 600 with a misassembly prevention structure in accordance with still another exemplary embodiment of the present invention. In FIG. 6, FIG. 6a is a perspective view of the steering shaft 600, and FIG. 6b is a partial cross-sectional view of the steering shaft 600.

Referring to FIG. 6, in the steering shaft 600 with a misassembly prevention structure according to still another exemplary embodiment of the present invention, an end portion of the shaft 610 is inserted into a slip member 620, whereby the shaft 610 and the slip member 620 are coupled to each other.

On the shaft 610, a torsion bar 611 is formed in the axial direction from the end of the shaft 610, serrations 612 are formed around the outer peripheral surface of the shaft 610 from the area where the formation of the torsion bar 611 is terminated, and a groove 613 is formed as a recess from the area where the formation of the serrations 612 is terminated. In order to further strengthen the tooth-meshing force between the shaft 610 and the yoke, serrations 614 may be further formed following the groove 613.

In the state in which the shaft 610 and the slip member 620 are coupled to each other, vibration or noise may be produced between the slip member 620 and the torsion bar 611.

In order to reduce such vibration or noise, the steering shaft 600 may further include a groove 6110 formed along the outer peripheral surface of the torsion bar 611, and a ring 630 inserted into the groove 6110 formed along the outer peripheral surface of the torsion bar 611 are opposed to each other.

At this time, the inner peripheral surface of the slip member 620 may be diametrically expanded. Here, the diametrical expansion area may correspond to the area where the groove 6110 is formed along the outer peripheral surface of the torsion bar 611.

Although the ring 630 is illustrated as a circular ring in FIG. 6, the ring may be an angled ring or a ring with any other shape.

The material of the ring 630 may be, for example, a plastic material or a rubber material, and any other material may be used for forming the ring 630 if the material is vibration-absorptive.

As illustrated in FIG. 6, in the steering shaft 600 with a misassembly prevention structure according to the present exemplary embodiment, it is possible to reduce vibration and noise produced in the steering shaft 600 by additionally inserting the ring 630 between the slip member 620 and the torsion bar 611.

Figure 7:
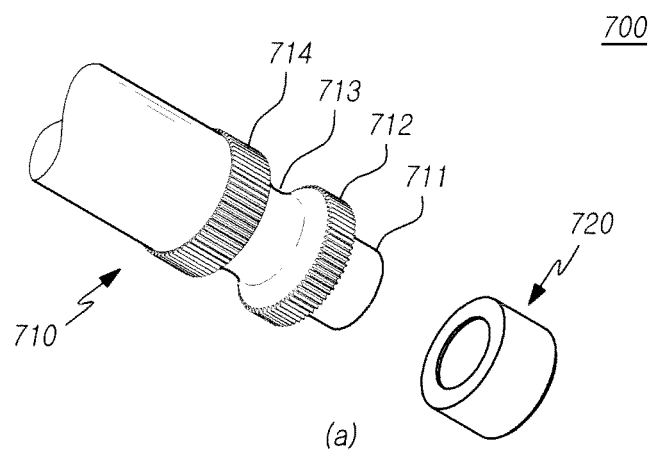
FIG. 7 illustrates a steering shaft with a misassembly prevention structure in accordance with still another exemplary embodiment of the present invention.
Figure 7:
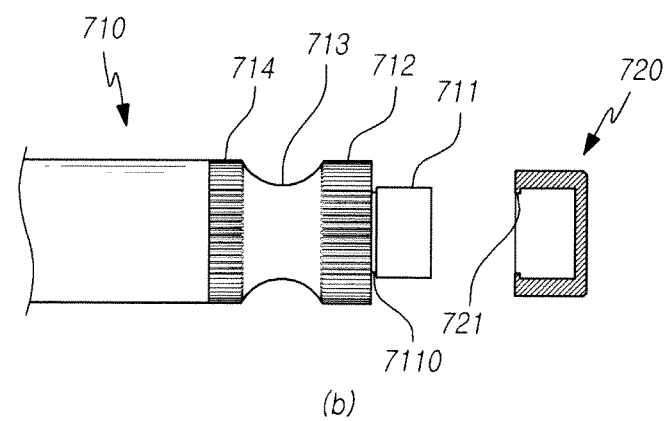

FIG. 7 illustrates a steering shaft 700 with a misassembly prevention structure in accordance with still another exemplary embodiment of the present invention. In FIG. 7, FIG. 7a is a perspective view of the steering shaft 700, and FIG. 7b is a partial cross-sectional view of the steering shaft 700.

Referring to FIG. 7, in the steering shaft 700 with a misassembly prevention structure according to still another exemplary embodiment of the present invention, an end portion of the shaft 710 is inserted into a slip member 720, whereby the shaft 710 and the slip member 720 are coupled to each other.

On the shaft 710, a torsion bar 711 is formed in the axial direction from the end of the shaft 710, serrations 712 are formed around the outer peripheral surface of the shaft 710 from the area where the formation of the torsion bar 711 is terminated, and a groove 713 is formed as a recess from the area where the formation of the serrations 712 is terminated. In order to further strengthen the tooth-meshing force between the shaft 710 and the yoke, serrations 714 may be further formed following the groove 713.

In order to prevent the shaft 710 or the slip member 720 from escaping in the state in which the shaft 710 and the slip member 720 are coupled to each other, a groove 7110 may be formed along the outer peripheral surface of the torsion bar 711, and the slip member 720 may be formed with a protrusion 721 along the inner peripheral surface thereof to correspond to the groove 7110 formed along the outer peripheral surface of the torsion bar 711.

Figure 8:
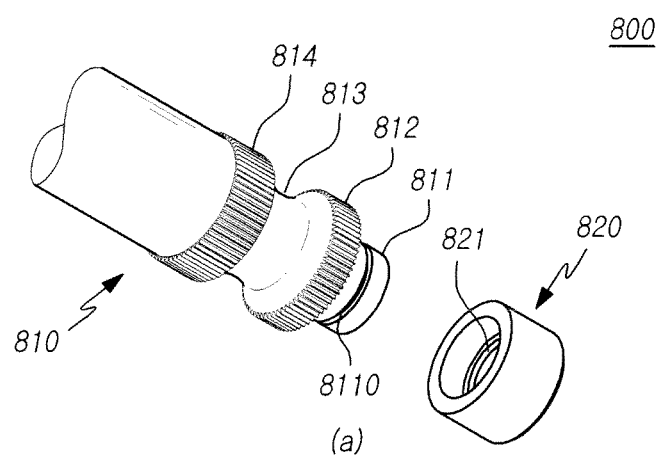
FIG. 8 illustrates a steering shaft with a misassembly prevention structure in accordance with yet another exemplary embodiment of the present invention.
Figure 8:
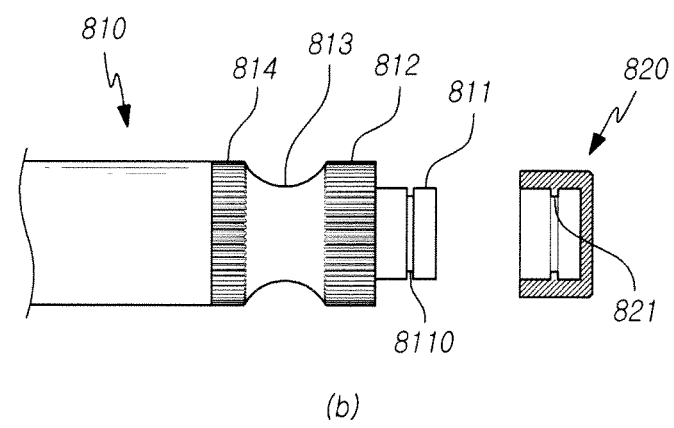

FIG. 8 illustrates a steering shaft 800 with a misassembly prevention structure in accordance with yet another exemplary embodiment of the present invention. In FIG. 8, FIG. 8a is a perspective view of the steering shaft 800, and FIG. 8b is a partial cross-sectional view of the steering shaft 800.

Referring to FIG. 8, in the steering shaft 800 with a misassembly prevention structure according to yet another exemplary embodiment of the present invention, an end portion of the shaft 810 is inserted into a slip member 820, whereby the shaft 810 and the slip member 820 are coupled to each other.

On the shaft 810, a torsion bar 811 is formed in the axial direction from the end of the shaft 810, serrations 812 are formed around the outer peripheral surface of the shaft 810 from the area where the formation of the torsion bar 811 is terminated, and a groove 813 is formed as a recess from the area where the formation of the serrations 812 is terminated. In order to further strengthen the tooth-meshing force between the shaft 810 and the yoke, serrations 814 may be further formed following the groove 813.

In order to prevent the shaft 810 or the slip member 820 from escaping in the state in which the shaft 810 and the slip member 820 are coupled to each other, a groove 8110 may be formed along the outer peripheral surface of the torsion bar 811, and the slip member 820 may be formed with a protrusion 821 along the inner peripheral surface thereof to correspond to the groove 8110 formed along the outer peripheral surface of the torsion bar 811.

The slip members 120, 220, . . . , 820 included in the above-described steering shafts 100, 200, 800 may be formed, for example, from a plastic material or a metal material.

In accordance with the exemplary coupling structures described above, in the state in which a slip member 120, 220, . . . , or 820 is coupled with a shaft 110, 210, . . . , or 810, the shaft 110, 210, . . . , or 810 coupled with the slip member 120, 220, . . . , or 820 is tooth-meshed with the yoke as being inserted into the yoke, and the steering shaft 100, 200, . . . , or 800 is assembled by fastening bolts through bolt-tightening holes formed in the yoke.

When assembling such a steering shaft, the assembly may be finished in a state in which the shaft 110, 210, . . . , or 810 coupled with the slip member 120, 220, . . . , or 820 is not fully inserted into nor tooth-meshed with the yoke. Now, a principle for confirming such a misassembled state prior to releasing a vehicle so as to prevent the misassembled state from remaining in a released vehicle will be described in detail with reference to FIG. 9.

Figure 9:
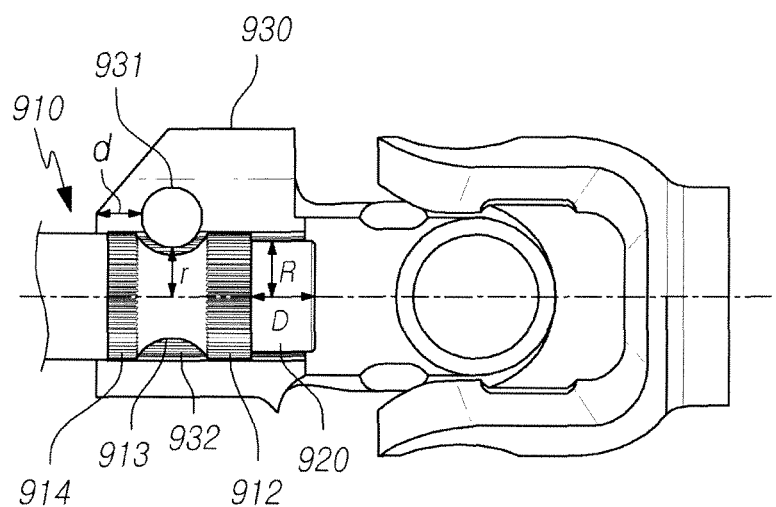
FIG. 9 illustrates a steering shaft with a misassembly prevention structure in accordance with yet another exemplary embodiment of the present invention in a correctly assembled state and in a misassembled state.
Figure 9:
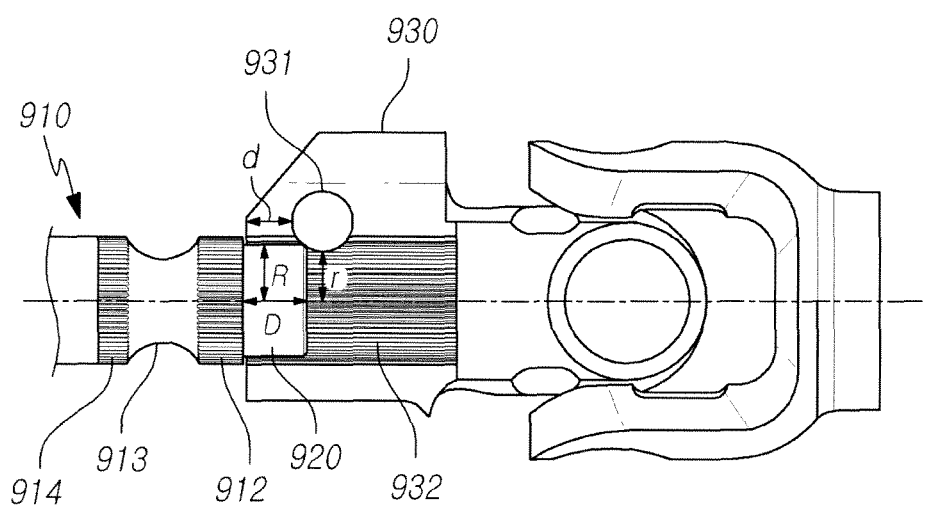

In FIG. 9, FIGS. 9a and 9b illustrate a correctly assembled state and a misassembled state of a steering shaft 900 with a misassembly prevention structure according to an exemplary embodiment of the present invention.

Although the steering shaft 900 may be any of the steering shafts 100, 200, . . . , and 800 illustrated in FIGS. 1 to 8, reference numerals different from those used in these drawings are used in the following description for the convenience of description.

Referring to FIG. 9, the steering shaft 900 includes: a shaft 910, in which a torsion bar is formed in the axial direction from the end of the shaft 910, serrations 912 are formed around the outer peripheral surface of the shaft 910 from the area where the formation of the torsion bar is terminated, a groove 913 is formed as a recess from the area where the formation of the serrations 912 is terminated, and serrations 914 are formed following the groove 913; a slip member 920, into which the torsion bar is inserted so that the slip member 920 is coupled with the shaft 900; and a yoke 930, in which serrations 932 are formed on the inner peripheral surface of the yoke 930 to be tooth-meshed with the serrations 912 and 914 formed on the shaft 910 when the shaft 910 is inserted into the yoke 930 in a state in which the slip member 920 is coupled to the end of the shaft 910, and a bolt tightening hole 931 is formed to bolt the yoke 930 with the shaft 910.

Referring to FIG. 9a, the shaft 910 is inserted into a hole of the yoke 930 in such a manner that the groove 913 of the shaft 910 positionally corresponds to the bolt tightening hole 931 of the yoke 930, in which state, a technician fastens a bolt to the bolt tightening hole 931 to finish the assembly.

In this assembled state, because the serrations 912 and 914 formed on the outer periphery of the shaft 910 are tooth-meshed with the serrations 932 formed on the inner peripheral surface of the yoke 930, the shaft 910 and the yoke are rotated in unison.

That is, if the shaft 910 is a column side shaft connected with a steering wheel, when the shaft 910 is rotated, the yoke 930 is also rotated. If the shaft 910 is a pinion shaft, and the yoke 930 is coupled to the column side shaft connected to the steering wheel, when the yoke 930 is rotated, the shaft 910 is also rotated.

Such an assembled state is a correctly assembled state in which the shaft 910 is inserted into the yoke 930 and fastened not to come off, and the shaft 910 and the yoke 930 can be rotated in unison, whereby a steering force can be correctly transmitted.

FIG. 9b illustrates a state in which the steering shaft 900 with a misassembly prevention structure according to an exemplary embodiment is misassembled in such a manner that only the slip member 920 coupled with the shaft 910 is inserted into the hole of the yoke 930, in which state a technician may fasten the bolt to the bolt fastening hole 931 to finish the assembly.

In such a state, the serrations 912 and 914 formed on the outer peripheral surface of the shaft 910 are not tooth-meshed with the serrations 932 formed on the inner peripheral surface of the yoke 930. Therefore, if the shaft 910 is the column side shaft connected with the steering wheel, the yoke 930 is not rotated when the shaft 910 is rotated as the steering wheel is rotated. That is, only the shaft 910 idles. If the shaft 910 is a pinion shaft, when the yoke 930 is rotated as the steering wheel is rotated, the shaft 910 is not rotated. That is, only the yoke 930 idles.

Such an assembled state is a misassembled state in which the shaft 910 and the yoke 930 are not rotated in unison, and thus a steering force cannot be transmitted.

Like this, in order to make the shaft 910 or the yoke 930 idle in the misassembled state, the following design requirements should be met (see FIG. 9):

Design requirements:
1. D>d
2. R>r

The first design requirement means that the axial length D of the slip member 920, into which the torsion bar of the shaft 910 is inserted, should be designed to be longer than the length d from the inserting entrance for the shaft 910 to the bolt tightening hole 931 in the yoke 930.

The second design requirement means that the radius R of the slip member 920, into which the torsion bar of the shaft 910 is inserted, should be designed to be longer than the length r from the central axis of the yoke 930 to the bolt tightening hole 931.

As described above, according to the present invention, it is possible to provide a steering shaft 900 with a misassembly prevention structure which, when the shaft 910 is misassembled as being inserted into and assembled with the yoke 930, allows the misassembled state to be confirmed by making the shaft 910 or the yoke 930 idle, thereby preventing misassembly.

A conventional steering shaft includes a yoke and a shaft as power transmission members. When the yoke and the shaft are coupled to each other so as to assemble the steering shaft, even if the assembly of the steering shaft was finished by fastening a bolt to the bolt tightening hole of the yoke in a state in which the groove on the shaft was not inserted to the position corresponding to the bolt tightening hole of the yoke and only the serrations of the shaft were tooth-meshed with the serrations of the yoke (i.e., in an incompletely assembled state), the shaft and the yoke are rotated in unison. Therefore, it is impossible to instantly confirm that the bolt was fastened without inserting the groove of the shaft to the position corresponding to the bolt tightening hole of the yoke. That is, the conventional steering shaft has a configuration that does not allow a misassembled state to be confirmed even if the steering shaft was misassembled. However, the yoke or the shaft may come off and idle after a certain period of time or after occurrence of impact. If such a phenomenon occurs during driving, a very serious accident may be caused.

In contrast, because the inventive steering shaft 900 is configured such that when the steering shaft 900 is misassembled, the shaft 910 and the yoke 930 cannot be rotated in unison (i.e., in a misassembly prevention structure), it is possible to simply inspect the misassembled state merely by rotating the steering wheel prior to releasing a vehicle from the factory.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A steering shaft with a misassembly prevention structure comprising:
    a shaft comprising a torsion bar formed in the axial direction from an end of the shaft, serrations formed on the outer peripheral surface of the shaft from the area where the formation of the torsion bar is terminated, and a groove formed as a recess from the area where the formation of the serrations is terminated;
    a slip member configured to be coupled with the shaft by inserting the torsion bar into the slip member;
    a yoke comprising serrations formed on the inner peripheral surface of the yoke to be tooth-meshed with the serrations formed on the shaft when the shaft coupled with the slip member is inserted into the yoke, and a bolt tightening hole formed to bolt the yoke with the shaft;
    a groove formed along the outer peripheral surface of the torsion bar; and
    a ring inserted into the groove.

2. The steering shaft as claimed in claim 1, wherein the slip member is a bush type, in which the opposite sides in the axial direction are opened, or a cap type, in which only one side in the axial direction is opened.

3. The steering shaft as claimed in claim 1, wherein the slip member has a slit formed in the axial direction.

4. The steering shaft as claimed in claim 1, wherein a groove is formed along the inner peripheral surface of the slip member, and
    the ring is inserted into a space formed as the groove formed along the inner peripheral surface of the slip member and the groove formed along the outer peripheral surface of the torsion bar are opposed to each other.

5. The steering shaft as claimed in claim 1, wherein the inner peripheral surface of the slip member is diametrically expanded at an area corresponding to the area where the groove formed along the outer peripheral surface of the torsion bar is formed.

6. The steering shaft as claimed in claim 1, wherein the slip member is formed from a plastic material or a metal material.

* * * * *